US012024938B2

(12) United States Patent
Von Der Wehd et al.

(10) Patent No.: US 12,024,938 B2
(45) Date of Patent: Jul. 2, 2024

(54) SPINDLE DRIVE FOR A CLOSURE ELEMENT OF A MOTOR VEHICLE

(71) Applicant: Brose Fahrzeugteile SE & Co. Kommanditgesellschaft, Bamberg, Bamberg (DE)

(72) Inventors: Rene Von Der Wehd, Ebern (DE); Florian Wölker, Hausen (DE)

(73) Assignee: Brose Fahrzeugteile SE & Co. Kommanditgesellschaft, Bamberg (DE)

(*) Notice: Subject to any disclaimer, the term of this patent is extended or adjusted under 35 U.S.C. 154(b) by 169 days.

(21) Appl. No.: 17/632,196

(22) PCT Filed: Aug. 4, 2020

(86) PCT No.: PCT/EP2020/071904
§ 371 (c)(1),
(2) Date: Feb. 1, 2022

(87) PCT Pub. No.: WO2021/023742
PCT Pub. Date: Feb. 11, 2021

(65) Prior Publication Data

US 2022/0282544 A1 Sep. 8, 2022

(30) Foreign Application Priority Data

Aug. 5, 2019 (DE) ..................... 10 2019 121 094.1

(51) Int. Cl.
*E05F 15/622* (2015.01)
*E05F 15/53* (2015.01)

(52) U.S. Cl.
CPC ............ *E05F 15/622* (2015.01); *E05F 15/53* (2015.01); *E05Y 2900/546* (2013.01)

(58) Field of Classification Search
CPC .. E05F 15/622; E05F 15/53; E05Y 2900/546; Y10T 74/18576
See application file for complete search history.

(56) References Cited

U.S. PATENT DOCUMENTS 3,801,085 A 4/1974 Sandor
7,416,237 B1 * 8/2008 Kachouch ................ F16F 9/56 277/928

(Continued)

FOREIGN PATENT DOCUMENTS

DE 102007027219 A1 1/2008
DE 102011122051 A1 6/2012

(Continued)

*Primary Examiner* — Justin B Rephann
(74) *Attorney, Agent, or Firm* — Dickinson Wright PLLC

(57) ABSTRACT

A spindle drive for a closure element of a motor vehicle. The spindle drive including a drive unit and a spindle-spindle nut transmission and including a spindle and a spindle unit for generating drive movements. The spindle drive including first and second drive sections, including first and second drive connections and configured to move relative to another between a retracted state and mi extended state over an adjustment path along a longitudinal axis of the drive unit. The spindle disposed in the second drive section and is axially fixed relative to the first drive connection, and the spindle nut is disposed in the first drive section and is axially fixed relative to the second drive connection. The spindle drive includes a support sleeve radially surrounding the spindle nut in the extended state and is mounted such that the spindle nut is axially moved relative to the two drive connections.

21 Claims, 7 Drawing Sheets

(56) References Cited

U.S. PATENT DOCUMENTS

| | | | | |
|---|---|---|---|---|
| 7,665,794 | B2 * | 2/2010 | Kachouh | F16H 25/2056<br>74/424.81 |
| 9,605,735 | B2 * | 3/2017 | Missler | F16F 9/369 |
| 9,689,188 | B2 * | 6/2017 | Fischer | F16H 25/2418 |
| 9,976,332 | B2 * | 5/2018 | Scheuring | F16D 7/06 |
| 2007/0296243 | A1 * | 12/2007 | Borrmann | E05F 15/622<br>296/146.4 |
| 2008/0060273 | A1 * | 3/2008 | Bochen | H02K 7/06<br>49/340 |
| 2008/0061643 | A1 * | 3/2008 | Bochen | H02K 7/06<br>292/201 |
| 2009/0120003 | A1 * | 5/2009 | Bochen | E05F 15/53<br>49/340 |
| 2010/0186528 | A1 * | 7/2010 | Hillen | E05F 15/622<br>192/56.6 |
| 2016/0144694 | A1 * | 5/2016 | Shchokin | B60J 5/107<br>475/331 |

FOREIGN PATENT DOCUMENTS

| | | | |
|---|---|---|---|
| DE | 102015106356 | A1 | 6/2016 |
| WO | 2018025709 | A1 | 2/2018 |

* cited by examiner

SPINDLE DRIVE FOR A CLOSURE ELEMENT OF A MOTOR VEHICLE

CROSS-REFERENCE TO RELATED APPLICATIONS

This application is the U.S. National Phase of PCT Application No. PCT/EP2020/071904 filed on Aug. 4, 2020, which claims priority to German Patent Application No. DE 10 2019 121 094.1, filed on Aug. 5, 2019, the disclosures of which are hereby incorporated in their entirety by reference herein.

TECHNICAL FIELD

The present disclosure relates to a spindle drive for a closure element of a motor vehicle.

BACKGROUND

Vehicles may include one or more closure elements that may be adjusted between open and closed positions to provide access to the vehicle's interior. The term "closure element" is to be understood broadly. It includes tailgates, trunk lids, engine hoods, side doors, sliding doors, or the like, of a motor vehicle.

SUMMARY

The present disclosure is based on solving one or more problems of designing and developing a known spindle drive, described below, in such a way that it is further optimized with regard to the required installation space.

In one or more embodiments, a support sleeve is provided. The support sleeve may be configured such that during a drive movement from the retracted state into the extended state, is displaced in an axial direction, that is to say along the geometrical drive longitudinal axis of the spindle drive, in such a way that, in the extended state or even before the extended state is reached, said support sleeve mechanically reinforces the axial region in which the spindle nut is then located. In this case, the support sleeve in the extended state, compared with the retracted state, has been axially displaced relative to both drive connections. As a result, it is no longer necessary for each drive connection to be assigned its own sleeve which is fixed in each case axially relative thereto and which has to overlap with the sleeve assigned to the respectively other drive connection in the extended state. As a result, the axial region around the spindle nut can be optimally reinforced in the extended state using only a single sleeve, namely said support sleeve. As an example, this has the effect that optimal buckling resistance in relation to a buckling axis orthogonal to the drive longitudinal axis is achieved in this region, specifically without the need for two sleeves which overlap in this region.

By dispensing with a corresponding overlap region of two overlapping sleeves, it is possible to reduce the radial dimensions of the spindle drive. Furthermore, it may be possible for any outer housing to have a mechanically weak design. It is however also possible for an outer housing to be omitted entirely, as a result of which the dimensions in the radial direction can be further reduced. A reduction in the dimensions correspondingly also makes it possible for the installation space, required for the installation, in the motor vehicle to be smaller. Moreover, the reduced dimensions also have the effect of reducing the weight of the spindle drive.

As an example, it is proposed for the spindle drive to have a support sleeve which, in the extended state, radially surrounds the spindle nut and which is mounted in such a way that it is axially displaced relative to both drive connections during a drive movement from the retracted state into the extended state.

In one or more embodiments, the adjustment travel path along which the one drive connection or drive portion is adjusted in relation to the other drive connection or drive portion during the drive movement from the retracted state into the extended state to be divided into at least two or two travel path sections, and, during the drive movement, the support sleeve is displaced in relation to the spindle-side drive connection only in one of the travel path sections and is stationary in relation to this drive connection in another one of the travel path sections. As an example, the support sleeve is stationary in a first travel path section of the adjustment travel path and is axially displaced in an adjoining, second travel path section. In this case, the first travel path section is the travel path section of the adjustment travel path that is passed through first. The second travel path section is correspondingly passed through subsequently. As another example, it is however also possible for the support sleeve to be axially displaced in a first travel path section and be stationary in an adjoining, second travel path section.

According to one or more embodiments, the proposed spindle drive has a spindle guide tube and/or a torsion tube. The spindle guide tube connects the spindle nut in an axially fixed manner to the spindle nut-side drive connection and serves for the axial guidance of the spindle during the drive movements. The torsion tube is axially fixed relative to the drive connection of the drive portion to which the spindle is assigned, and serves firstly for the axial guidance of the spindle nut and secondly as an anti-twist safeguard between the spindle nut and the drive portion to which the spindle is assigned. The spindle guide tube and/or the torsion tube may be radially supported in the support sleeve, against the latter, in the extended state.

In one or more embodiments, the support sleeve may include first and a second support bearings, and the first and second support bearings may be configured to radially support the spindle guide tube and/or torsion tube on the support sleeve.

In one or more embodiments, the spindle guide tube may include a driver which, during the drive movement from the retracted state into the extended state, axially engages, in particular in a positively locking and/or force-fitting manner, with a driver counter piece on the support sleeve, as a result of which the support sleeve can be carried along over the second travel path section of the adjustment travel path, that is to say can therefore be axially displaced.

In another embodiment, the torsion tube may include a stop piece which, during the drive movement from the retracted state into the extended state, axially engages, for example, in a positively locking and/or force-fitting manner, with a stop counter piece on the support sleeve, as a result of which the support sleeve cannot be moved beyond the first travel path section.

In one or more embodiments, a covering sleeve has a driver which, during the drive movement from the retracted state into the extended state, axially engages, for example, in a positively locking and/or force-fitting manner, with a driver counter piece on the support sleeve, as a result of which the support sleeve can be carried along over the second travel path section of the adjustment travel path.

According to a further embodiment, which is of independent significance, a closure element arrangement of a motor vehicle, including a closure element for closing a closure element opening of the motor vehicle and comprising a spindle drive, which is coupled to the closure element on the one hand and the rest of the motor vehicle on the other hand, for motorized adjustment of the closure element, is claimed. In addition to the proposed spindle drive, a gas pressure spring for aiding the drive movement of the closure element into its open position may be provided. Reference may be made to all comments in relation to the proposed spindle drive.

BRIEF DESCRIPTION OF THE DRAWINGS

The invention will be explained in more detail below with reference to a drawing illustrating merely exemplary embodiments. In the drawing

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
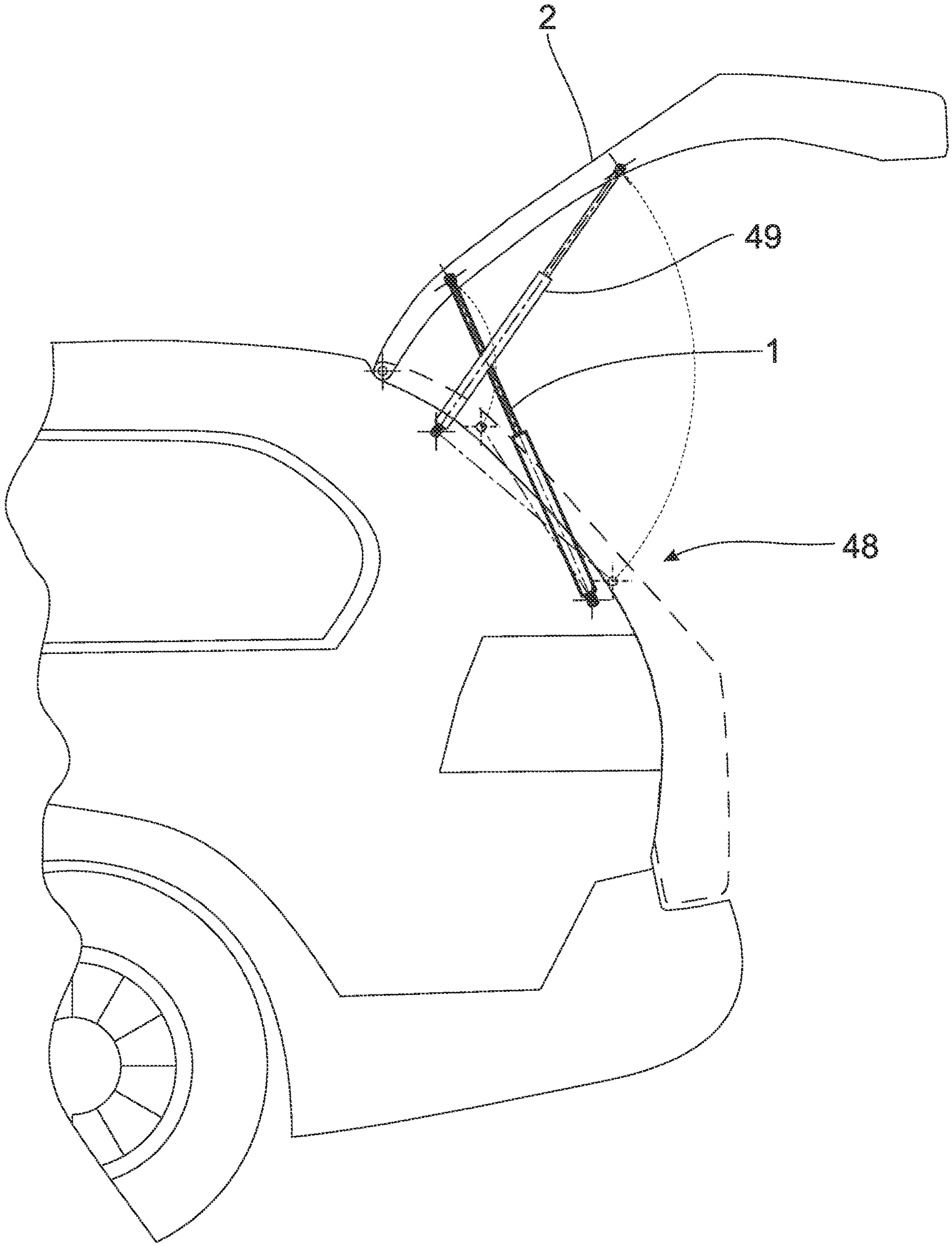
FIG. 1 shows a schematic side view of a motor vehicle with a proposed closure element arrangement, to which a proposed spindle drive is assigned.

The illustration of FIG. 1 shows a spindle drive 1 for a closure element 2, here for a tailgate of a motor vehicle. However, in principle, all other closure elements 2, for example, trunk lids, which are addressed in the introductory part of the description can also be used advantageously. All the following comments in relation to a tailgate likewise apply correspondingly to all other conceivable closure elements of a motor vehicle.

A known spindle drive is provided in DE 10 2015 106 356 A1, which provides motorized adjustment of a tailgate of a motor vehicle. The spindle drive has a drive unit and a spindle-spindle nut transmission, which is arranged downstream of the drive unit in terms of drive, for generating drive movements. The spindle drive has two drive portions having a respective drive connection for channeling out the drive movements. The drive connections can be adjusted, by means of the drive unit, that is to say in a motorized manner, in relation to one another, between a retracted state and an extended state, over an adjustment travel path along a geometrical drive longitudinal axis. The retracted state and the extended state correspond in this case to the end positions of the spindle drive. The closure element is thus in its completely closed position, referred to hereinafter as closed position, in the retracted state and in its maximally open position, referred to hereinafter as open position, in the extended state. The spindle is connected in an axially fixed manner to the one drive connection by way of the drive unit, and the spindle nut is connected in an axially fixed manner to the other drive connection by way of a spindle guide tube. A torsion tube which is axially fixed relative to the drive unit and spindle and in which the spindle nut is axially guided and secured against twisting is also provided. A spring arrangement comprising a helical compression spring is also provided, which preloads the two drive connections in relation to one another in the direction of the extended state of the spindle drive.

No outer housing is provided in the known spindle drive, and so the helical compression spring and, at least in the extended state, the spindle guide tube and the torsion tube are at least partially exposed in relation to the environment. Provided in the radial interspace between the helical compression spring on the one hand and the torsion tube and spindle guide tube on the other hand are two sleeves which run axially inside one another, one of which is axially fixed relative to the one drive connection and the other of which is axially fixed relative to the other drive connection. The two sleeves, which each have elongate, claw-like protuberances here, overlap in an axial portion in the extended state, as a result of which the mechanical stability of the spindle drive in this state is increased. Due to the omission of an outer housing, the spindle drive takes up less installation space, but can be further optimized with regard to its external dimensions, especially in the radial direction.

The spindle drive 1 has a drive unit 3 which, may include a drive motor 4 and an intermediate transmission 5 which is arranged downstream of the drive motor 4 in terms of drive. In addition or as an alternative to the intermediate transmission 5, the drive unit 3 may also have a brake and/or coupling arrangement (not illustrated).

A spindle-spindle nut transmission 6 comprising a spindle 7 and a spindle nut 8, which is in meshing engagement with the spindle 7 in a manner known per se, is in turn arranged downstream of the drive unit 3 in terms of drive. The spindle-spindle nut transmission 6 serves for the generation of drive movements. The spindle drive 1 has two drive portions 9, 10 which are equipped with a respective drive connection 11, 12 for channeling out the drive movements. In this case, the drive portion 9 is coupled by way of the drive connection 11 to the closure element 2, and the drive portion 10 is coupled by way of the drive connection 12 to the rest of the motor vehicle. By means of the drive unit 3, the two drive connections 11, 12 can be adjusted, in a manner known per se, in relation to one another, between a retracted state and an extended state which is illustrated in FIG. 1, over an adjustment travel path s along a geometrical drive longitudinal axis 13. This is derived from a combined look at FIG. 2*a*) and FIG. 2*c*) for a first exemplary embodiment. This is derived from a combined look at FIG. 4*a*) and FIG. 4*c*) for a second exemplary embodiment. This is derived from a combined look at FIG. 6*a*) and FIG. 6*b*) for a third exemplary embodiment.

For this, the spindle 7 is assigned to the one drive portion 10 and is axially fixed relative to the drive connection 12 of this drive portion 10. Here, the spindle 7 is connected in an axially fixed manner to the drive connection 12 by way of the drive unit 3. The spindle nut 8 is in turn assigned to the other drive portion 9 and is axially fixed relative to the drive connection 11 of this drive portion 9. Here, the spindle nut 8 is connected in an axially fixed manner to the drive connection 11 by way of a spindle guide tube 14. Here, the drive portion 10 to which the spindle 7 is assigned also has a torsion tube 15 in which the spindle nut 8 is axially guided and which provides an anti-twist safeguard between the spindle nut 8 and the drive portion 10 to which the spindle 7 is assigned. In this case, the spindle guide tube 14 and/or the torsion tube 15 are/is made, for example, of metal or a plastics material.

Here, the term "axially fixed" is to be interpreted broadly and also comprises a coupling with axial play. Here, the term "axially" always relates to the direction of extent of the drive longitudinal axis 13. Correspondingly, the term "radially" always relates to a direction orthogonal to the direction of extent of the drive longitudinal axis 13.

Furthermore, to produce an axial preload, with respect to the drive longitudinal axis 13, of the two drive portions 9, 10 in relation to one another, a spring arrangement comprising a helical spring may also be provided, which then preloads the spindle drive 1 into the extended state. It is also conceivable to provide a spring arrangement comprising a helical spring which preloads the spindle drive 1 in the direction of the retracted state. Here, however, such a spring arrangement has been omitted.

It is also conceivable for the proposed spindle drive 1 to have an outer housing with two housing parts which are guided telescopically inside one another and which, in the retracted and in the extended state of the spindle drive 1, completely cover the spindle 7, the spindle nut 8, the spindle guide tube 14 and/or the torsion tube 15, and, if a spring arrangement that preloads the two drive portions 9, 10 in relation to one another is present, this spring arrangement, in a radially outward direction. In addition or alternatively, the drive unit 3 may also be arranged radially within such an outer housing. The one housing part is then axially fixed relative to the one drive connection 11, and the other housing part is axially fixed relative to the other drive connection 12, respectively. Here, such an outer housing has been omitted.

In the case of the proposed spindle drive 1, the spindle drive may include a support sleeve 16 which, in the extended state, radially surrounds the spindle nut 8 and which is mounted in such a way that it is axially displaced relative to both drive connections 11, 12 during a drive movement from the retracted state into the extended state. The support sleeve 16, which is made, for example, of metal or a plastics material, is thus at a respectively greater axial spacing from the drive connection 11 and the drive connection 12 in the extended state than in the retracted state of the spindle drive 1. What is meant by a support sleeve is a tubular component that can absorb a radial load. The component may include an uninterrupted circumferential contour over its entire axial extent, it however also fundamentally being conceivable for the component to have one or more axial apertures in at least one axial portion, for example, axial end portion.

Such a support sleeve 16 increases the buckling resistance in the axial region of the spindle nut 8 in the extended state, which is particularly advantageous in the case of the exemplary embodiments illustrated here, which have no additional outer housing.

Figure 2:
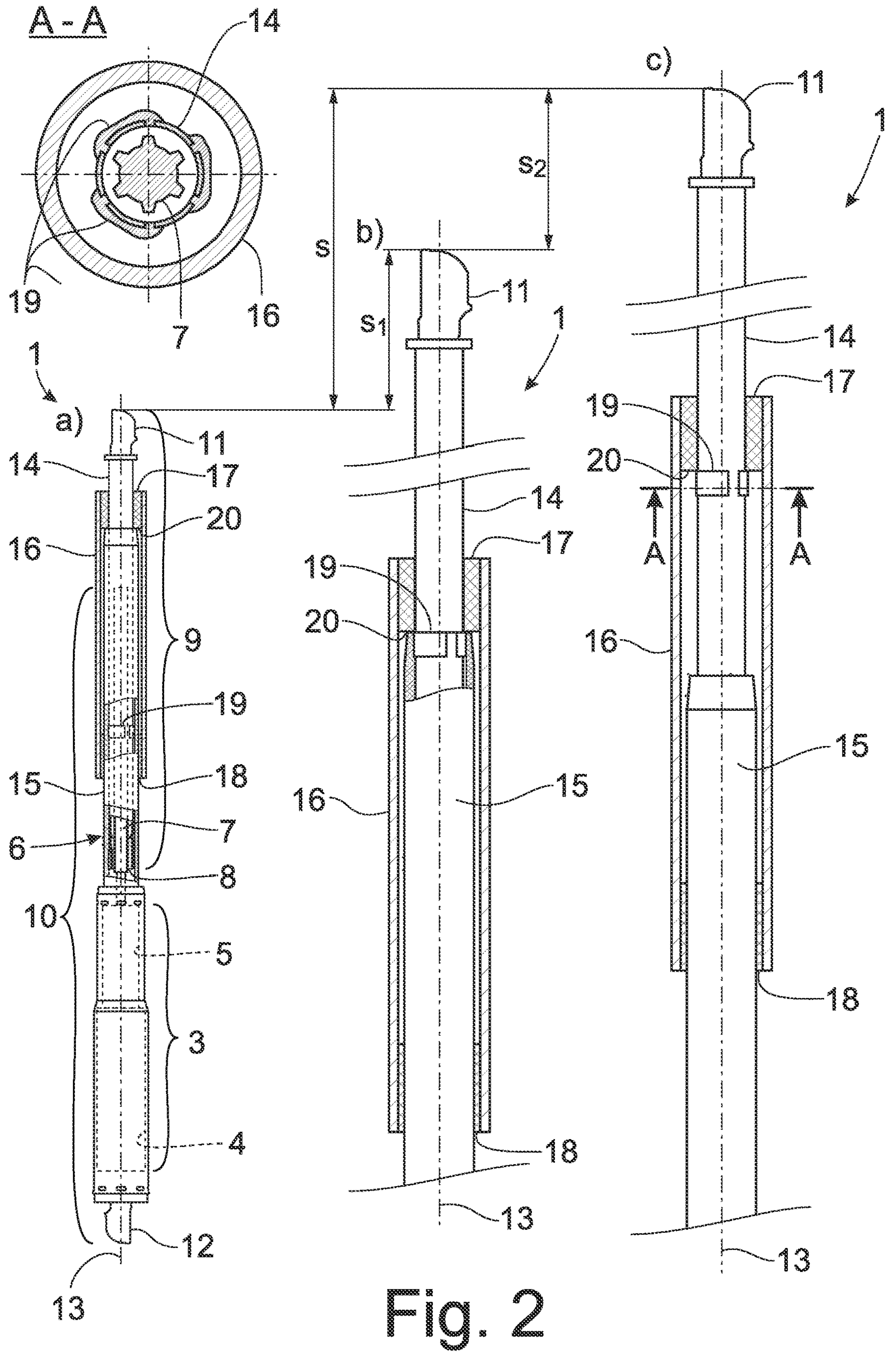
FIG. 2 shows a first exemplary embodiment of a proposed spindle drive in longitudinal section, a) in the retracted state, b) during a drive movement into the extended state, and c) in the extended state.
Figure 3:
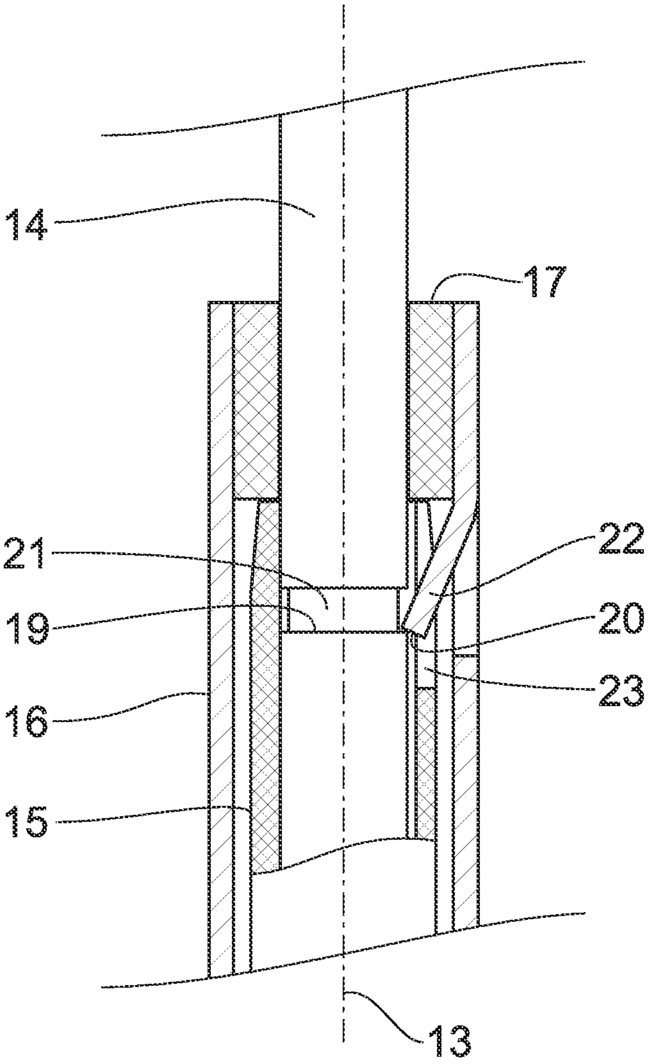
FIG. 3 shows a detail view of an alternative embodiment of the spindle drive as per FIG. 2 in longitudinal section.
Figure 6:
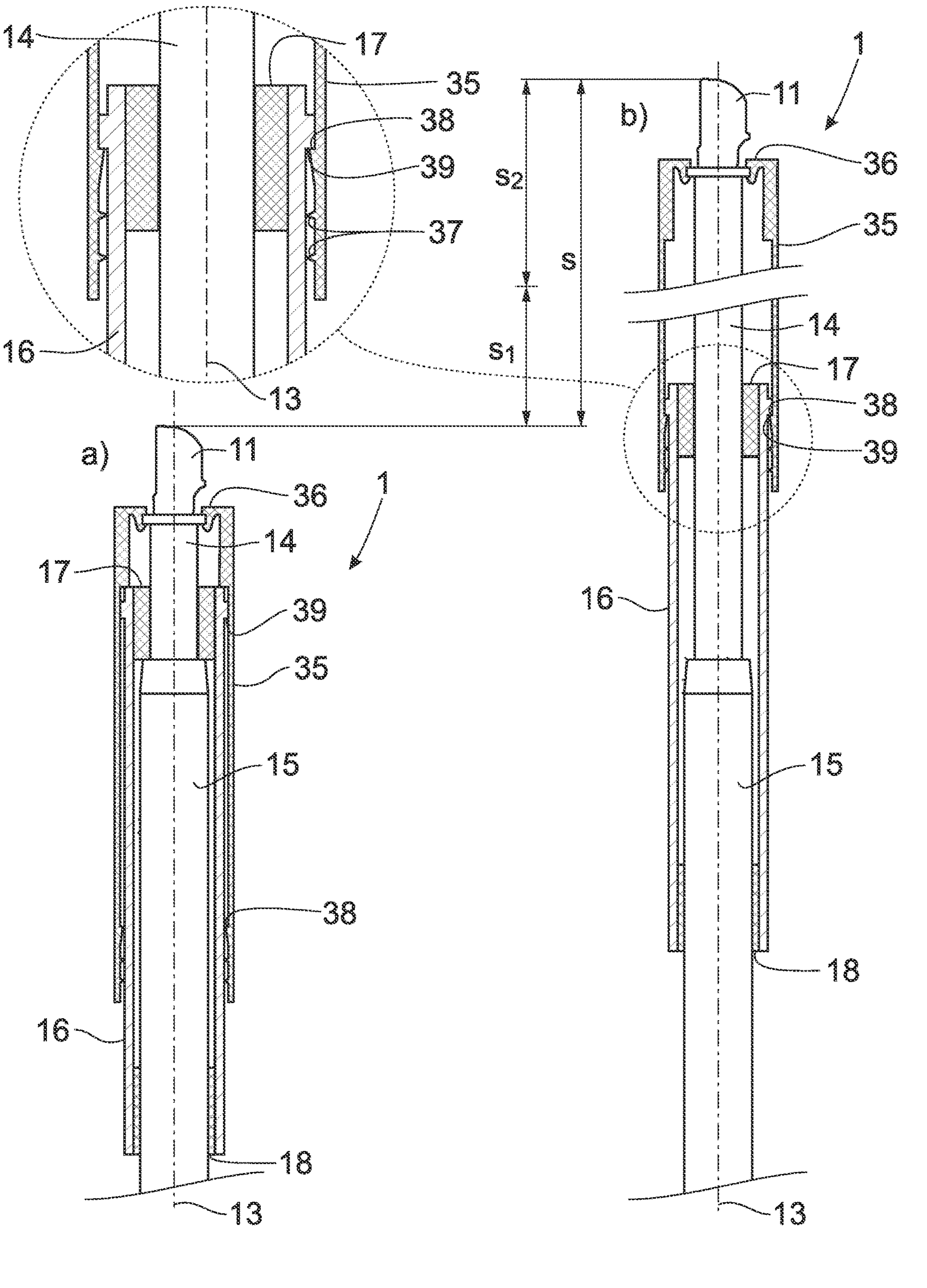
FIG. 6 shows a further exemplary embodiment of a proposed spindle drive in longitudinal section, a) in the retracted state, and b) in the extended state.
Figure 7:
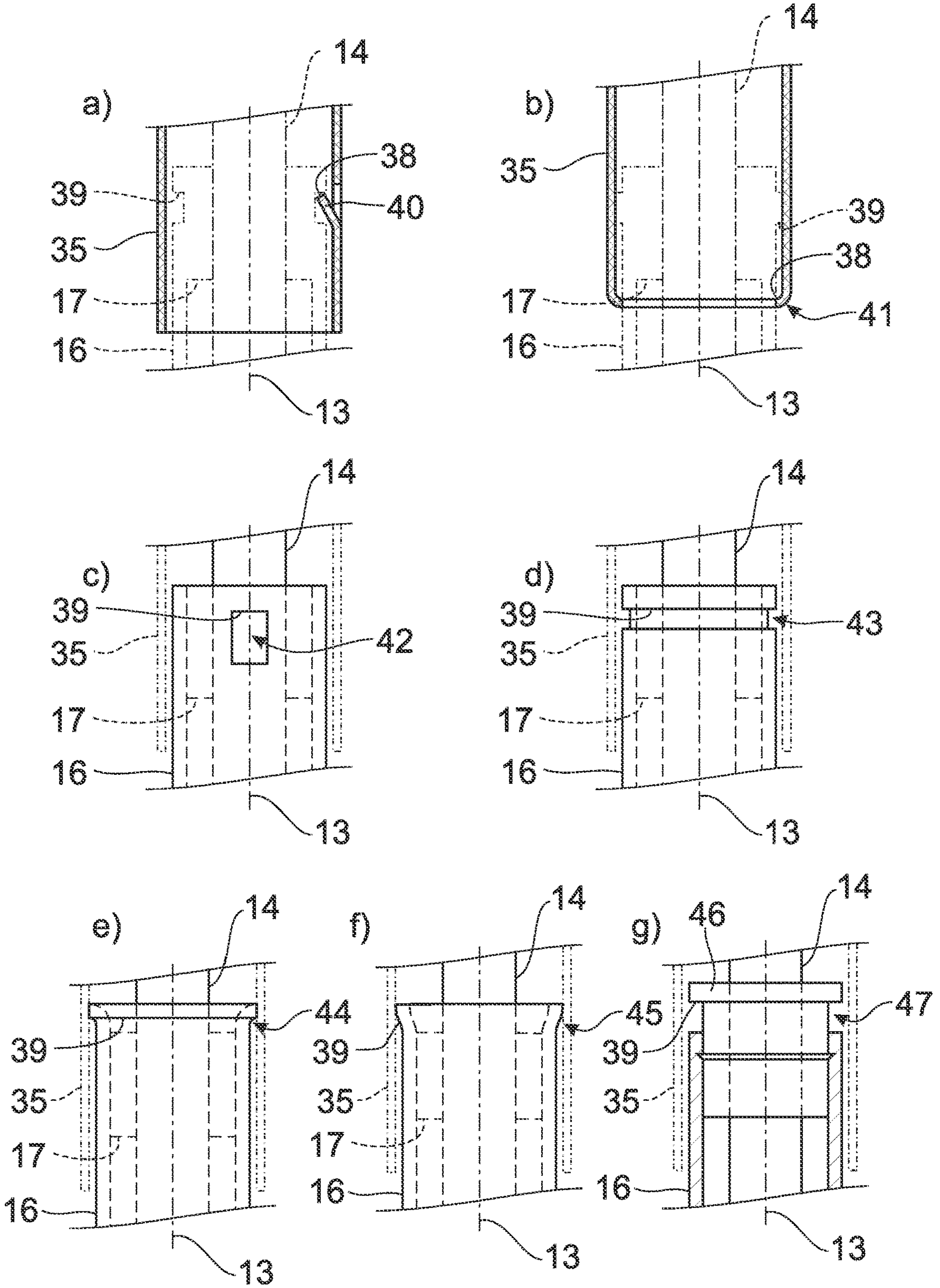
FIG. 7 shows a detail view of several alternative embodiments of the spindle drive as per FIG. 6 in longitudinal section.

The exemplary embodiments of FIGS. 2 and 3, on the one hand, and of FIGS. 6 and 7, on the other hand, have in common the fact that, during the drive movement from the retracted state into the extended state, the support sleeve 16 is stationary, that is to say is not axially displaced, relative to the drive connection 12 of the drive portion 10 to which the spindle 7 is assigned over a first travel path section $s_1$ of the adjustment travel path s, and is axially displaced relative thereto over a second travel path section $s_2$, adjoining the first travel path section $s_1$, of the adjustment travel path s. Here as an example, it is the case that the first travel path section $s_1$ and the second travel path section $s_2$ together form the overall adjustment travel path s, along which the two drive connections 11, 12 are displaced relative to one another when the spindle drive 1 is adjusted from the retracted state into the extended state. In this case, it is provided in the exemplary embodiments of FIGS. 2 and 3, on the one hand, and of FIGS. 6 and 7, on the other hand, that, proceeding from the retracted state, the support sleeve 16 is stationary relative to the drive connection 12 of the drive portion 10 to which the spindle 7 is assigned over the first travel path section $s_1$, and/or is axially displaced relative thereto over the second travel path section $s_2$ up to the extended state.

Figure 4:
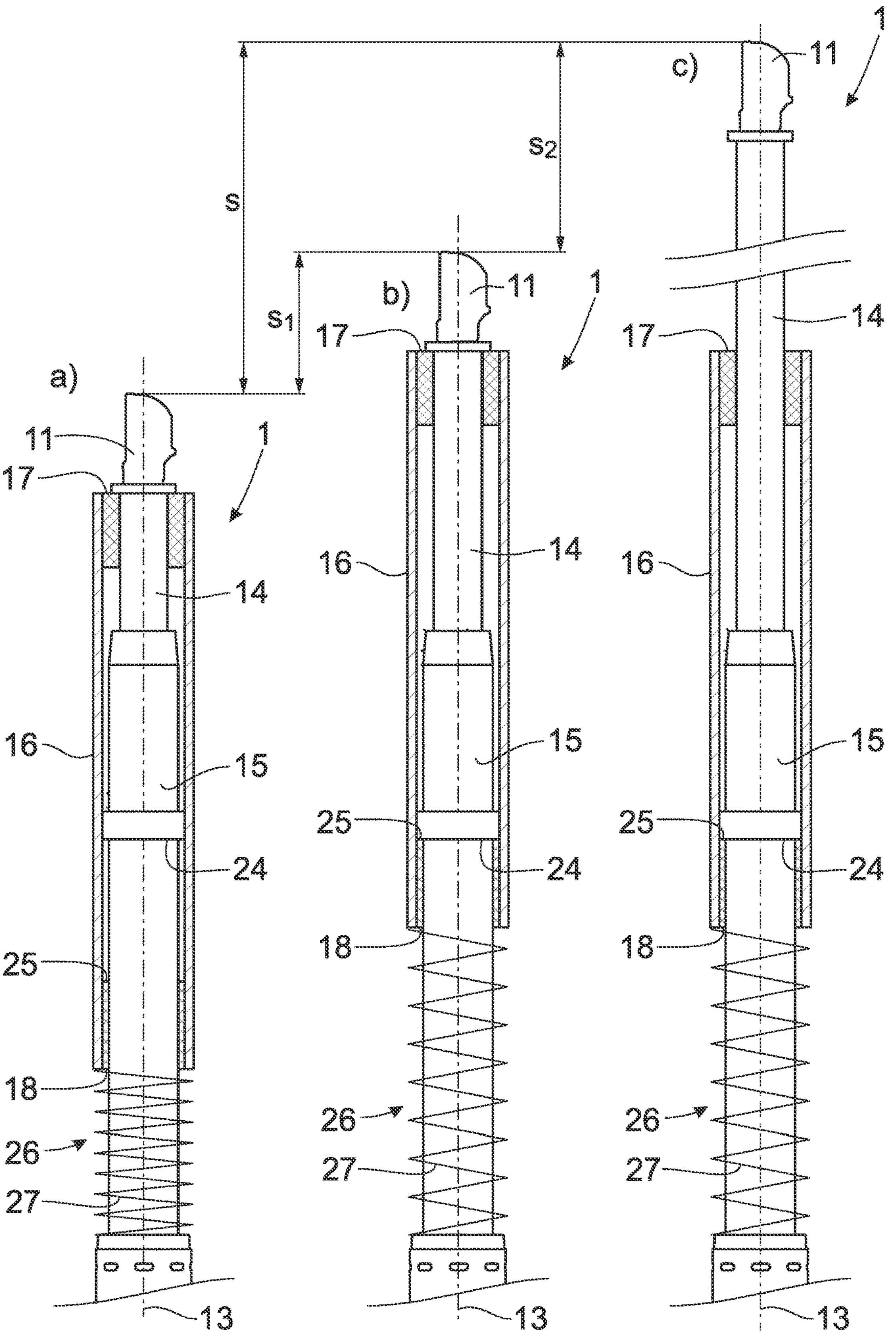
FIG. 4 shows a further exemplary embodiment of a proposed spindle drive in longitudinal section, a) in the retracted state, b) during a drive movement into the extended state, and c) in the extended state.
Figure 5:
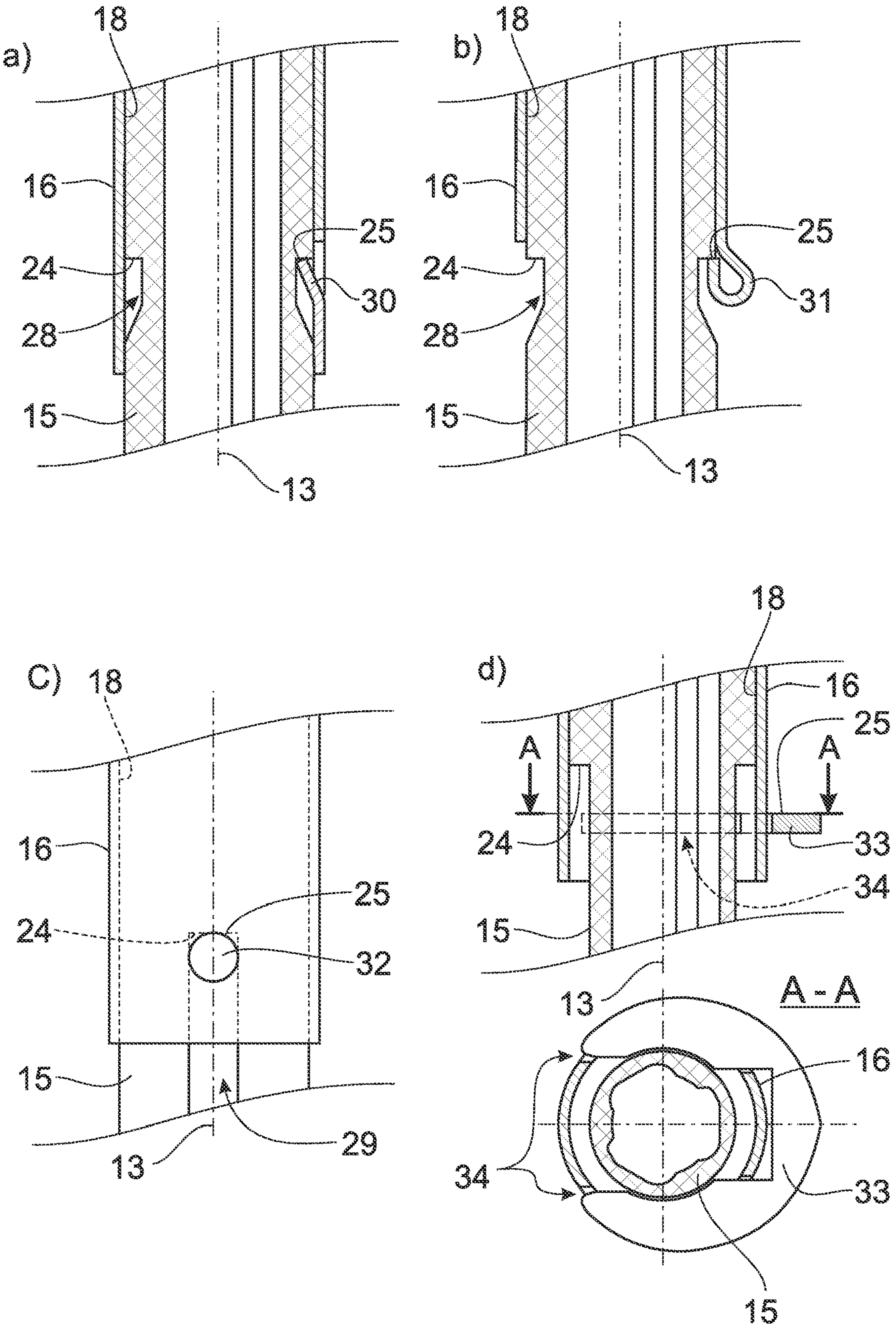
FIG. 5 shows a detail view of several alternative embodiments of the spindle drive as per FIG. 4 in longitudinal section.

By contrast, in the exemplary embodiments of FIGS. 4 and 5, a different sequence of movements of the support sleeve 16 is provided. Here, it is the case that, during the drive movement from the retracted state into the extended state, the support sleeve 16 is axially displaced relative to the drive connection 12 of the drive portion 10 to which the spindle 7 is assigned over a first travel path section $s_1$ of the adjustment travel path s, and is stationary, that is to say is not axially displaced, relative thereto over a second travel path section $s_2$, adjoining the first travel path section $s_1$, of the adjustment travel path s. Here, too, the first travel path section $s_1$ and the second travel path section $s_2$ together form the overall adjustment travel path s. In this case, it is also provided here that, proceeding from the retracted state, the support sleeve 16 is axially displaced relative to the drive connection of the drive portion 10 to which the spindle 7 is assigned over the first travel path section $s_1$, and/or is stationary relative thereto over the second travel path section $s_2$ up to the extended state.

In all the exemplary embodiments illustrated in the figures, it is also the case that, in the extended state of the spindle drive 1, the support sleeve 16 is located in an axial region in which the spindle nut 8 is also located within the support sleeve 16. This axial arrangement of the support sleeve 16 relative to the spindle nut 8 allows components of the spindle drive 1 to be radially supported on the support sleeve 16, as is explained in more detail further below, which ensures the increase in the buckling resistance in this region in the extended state. To this end, the support sleeve 16 axially extends over a certain region on both sides of the spindle nut 8 when the spindle drive 1 is in the extended state. The axial portion of the support sleeve 16, that extends in the axial direction on the one side of the spindle nut 8, may be at least substantially as large as the axial portion of the support sleeve 16 that axially extends on the other side of the spindle nut 8. In that case, in the extended state of the spindle drive 1, the spindle nut 8 is thus arranged substantially in the middle of the support sleeve 16 with respect to the axial direction. However, the spindle nut 8 may also be arranged so as to be axially offset with respect to the middle of the support sleeve 16 in the extended state.

Here as an example, the spindle guide tube 14 and/or the torsion tube 15 are/is radially supported in the support sleeve 16, against the latter, in the extended state, as shown by FIGS. 2c), 4c) and 6b). It is also the case that the spindle guide tube 14 and/or the torsion tube 15 are/is also radially supported in the support sleeve 16, against the latter, in the retracted state, as shown by FIGS. 2a), 4a) and 6a).

To enable such a supporting action, a first support bearing 17 and a second support bearing 18 may be provided on the support sleeve 16. In this case, the first and/or second support bearing 17, 18 may be a separate element which is connected, for example, in a cohesive, positively locking and/or force-fitting manner, to the rest of the support sleeve 16, for example, to a tubular portion of the support sleeve 16. However, in principle, the first and/or second support bearing 17, 18 may also be formed in one piece with the rest of the support sleeve 16.

The first and/or second support bearing 17, 18 is formed by a radially inner surface of the support sleeve 16. This surface may be a planar or a non-planar surface. For instance, it is for example conceivable for the surface to be formed as an internal thread in the region of the respective support bearing 17, 18, for example, of the first support bearing 17, the internal thread then interacting in a meshing manner with a corresponding external thread of the tube 14, 15, for example, spindle guide tube 14, which is radially supported on the, for example, twistable, support sleeve 16.

The first and/or second support bearing 17, 18 may include one or more radially inwardly protruding portions which form the radially inner surface of the support sleeve 16, but may also be aligned with the rest of the radially inner surface of the support sleeve 16. Provision may be made for the inner diameter of the support sleeve 16 in the axial region of the first and/or second support bearing 17, 18 to be smaller than in the axial region between the first and second support bearing 17, 18, or for the inner diameter of the support sleeve 16 in the axial region of the first and/or second support bearing 17, 18 to be identical to that in the axial region between the first and second support bearing 17, 18.

Here as an example, it is the case that the support sleeve 16 has two support bearings 17, 18 which are axially spaced apart from one another, of which the first support bearing 17 is configured to radially support the spindle guide tube 14 on the support sleeve 16 and/or of which the second support bearing 18 is configured to radially support the torsion tube 15 on the support sleeve 16. The radial support is in each case a direct support, as a result of which the respective tube 14, 15 bears, for example, sealingly, directly against the respective support bearing 17, 18.

As already explained above, it is provided in the exemplary embodiments of FIGS. 2 and 3 that the support sleeve 16 is conjointly axially moved over the second travel path section 52, that is to say when the drive connection 11 passes through the second travel path section $s_2$ of the adjustment travel path s relative to the drive connection 12. For this purpose, the spindle guide tube 14 may include a driver 19 which, during the drive movement from the retracted state (FIG. 2a)) into the extended state (FIG. 2c)), provides an axial stop for a driver counter piece 20 on the support sleeve 16. This is effected for example, in such a way that, during the drive movement from the retracted state into the extended state, the support sleeve 16 is carried along by the driver 19 of the spindle guide tube 14, along the geometrical drive longitudinal axis 13, over the second travel path section $s_2$. In this respect, it is the case that, during the drive movement from the retracted state into the extended state, the driver 19 of the spindle guide tube 14 and the driver counter piece 20 of the support sleeve 16 are engaged, for example, constantly, when the second travel path section $s_2$ is being passed through and/or are disengaged in the retracted state and/or disengage during a drive movement from the extended state into the retracted state. As an example, the driver 19 is formed by one or more radially outwardly protruding portions of the spindle guide tube 14. Here, in addition or alternatively, the driver counter piece 20 is formed by one or more radially inwardly protruding portions of the support sleeve 16, or by one of the support bearings 17, 18, for example, by the first support bearing 17. Such an embodiment is illustrated by way of example in FIG. 2.

By contrast, in the further embodiment shown in FIG. 3, a driver 19 is provided which is formed by one or more radially inwardly set-back portions of the spindle guide tube 14, here for example by a circumferential groove 21. Here, in addition or alternatively, the driver counter piece 20 is formed by one or more radially inwardly protruding, for example, elastic, portions of the support sleeve 16, here for example by a latching hook 22. In this embodiment, in order for the driver 19 to be able to engage with the driver counter piece 20 at the start of the second travel path section $s_2$, the torsion tube 15 may include a cutout 23, for example in the form of an axial gap, through which the driver 19 extends relative to the driver counter piece 20.

In both the embodiment of FIG. 2 and the embodiment of FIG. 3, it is also the case that the driver 19 axially dips into the torsion tube 15 during the drive movement from the extended state into the retracted state. Since the driver 19 protrudes to some extent in relation to the rest of the spindle guide tube 14 in the embodiment of FIG. 2, the contour providing the anti-twist safeguard, here a flower-like contour, is formed in the torsion tube 15 such that the torsion tube 15 can also accommodate the driver 19.

FIGS. 4 and 5 now show an exemplary embodiment in which the support sleeve 16 is conjointly moved over the first travel path section $s_1$ of the adjustment travel path s, but is then prevented from any further conjoint movement when the second travel path section $s_2$ is being passed through. To this end, the torsion tube 15 has a stop piece 24 which, during the drive movement from the retracted state (FIG. 4a)) into the extended state (FIG. 4c)), provides an axial stop for a stop counter piece 25 on the support sleeve 16. This is effected for example, in such a way that, during the drive movement from the retracted state into the extended state, the support sleeve 16 cannot be moved beyond the first travel path section $s_1$. In this respect, as an example, it is the case that, during the drive movement from the retracted state into the extended state, the stop piece 24 of the torsion tube 15 and the stop counter piece of the support sleeve 16 are engaged, for example, constantly, when the second travel path section $s_2$ is being passed through and/or are disengaged in the retracted state and/or disengage during a drive movement from the extended state into the retracted state.

In order to conjointly move the support sleeve 16 over the first travel path section $s_1$, as an example, the support sleeve 16 is preloaded, here in the retracted state and in the extended state, in the direction of the drive movement from the retracted state into the extended state and/or in the direction from the drive connection 12 of the drive portion 10 to which the spindle 7 is assigned, relative to the drive connection 11 of the other drive portion 9. As an example, the preload is provided by a spring arrangement 26 comprising at least one spring 27, for example, a compression or tension spring. The spring arrangement 26 may be arranged between the drive unit 3 and the support sleeve 16, for example, the second support bearing 18. In this case, the one spring end of the spring 27 pointing upward in FIG. 4 acts on a lower axial end side of the support sleeve 16. In addition or alternatively, a spring 27 may also be arranged between the drive connection 11 and the support sleeve 16, in which case the downwardly pointing spring end of the spring 27 then acts for example, on an upper axial end side of the support sleeve 16.

In addition or alternatively, at least one magnet arrangement and/or latching arrangement may be provided (not illustrated) which, during the drive movement from the retracted state into the extended state, retains the support sleeve 16 on the drive connection 11 of the drive portion 9 to which the spindle nut 8 is assigned, or on the spindle guide tube 14, when the first travel path section $s_1$ is being passed through and which releases the connection between the support sleeve 16 and this drive connection 11 and/or spindle guide tube 14 as soon as the second travel path section $s_2$ is passed through during the drive movement from the retracted state into the extended state. In addition or alternatively, at least one magnet arrangement and/or latching arrangement may also be provided (not illustrated) which, during the drive movement from the retracted state into the extended state, retains the support sleeve 16 on the torsion tube 15 when the second travel path section $s_2$ is being passed through and which releases the connection between the support sleeve 16 and the torsion tube 15 as soon as the first travel path section $s_1$ is passed through during the drive movement from the extended state into the retracted state.

In the embodiment in FIG. 4, it is also the case that the stop piece 24 is formed by one or more radially outwardly protruding portions of the torsion tube 15. In addition or alternatively, the stop counter piece 25 is formed by one or more radially inwardly protruding portions of the support sleeve 16, preferably by one of the support bearings 17, 18, for example, by the second support bearing 18.

FIGS. 5*a*) to *d*) show further alternative embodiments in which a stop piece 24 and a stop counter piece 25 also engage during the drive movement from the retracted state into the extended state such that the support sleeve 16 can no longer be conjointly moved over the second travel path section $s_2$.

According to the embodiments in FIGS. 5*a*) to *c*), the stop piece 24 is formed by one or more radially inwardly set-back portions of the torsion tube 15. By way of example, in the embodiments in FIGS. 5*a*) and *b*), a circumferential groove 28 is provided, and in the embodiment in FIG. 5*c*), an axial groove 29 is provided, the grooves forming the respective stop piece 24. In the embodiment of FIG. 5*d*), the stop piece 24 is formed by one or more radially outwardly protruding portions of the torsion tube 15. The torsion tube 15 thus has a first, relatively small diameter in a first axial portion extending from the drive unit 3. The diameter of the torsion tube 15 widens at the point where the axial stop is provided, and the diameter of the torsion tube 15 then remains in widened form over the further profile, at least over an axial portion of the torsion tube 15. This axial portion is then the outwardly radially protruding portion that forms the stop piece 24 at the point where the diameter widens.

In addition or alternatively, it may be provided, as here, that the stop counter piece 25 is formed by one or more radially inwardly protruding, for example, elastic, portions of the support sleeve 16. In the embodiment of FIG. 5*a*), this is a latching hook 30 which radially inwardly extends in the region of a cutout within the wall of the support sleeve 16. In the embodiment of FIG. 5*b*), a latching hook 31 is also provided, which has been produced by bending an axial end portion of the support sleeve 16. In the latter case, it is also conceivable for the support sleeve 16 to be bent correspondingly over its entire circumference and not only over a circumferential portion, which would then result in the formation not of a latching hook but of a circumferential latching element. In the embodiment of FIG. 5*c*), the stop counter piece 25 is formed by a guide pin 32, which radially inwardly protrudes on the radially inner side of the support sleeve 16 from the cylindrical inner surface thereof and engages into the axial groove 29. In this case, an axial end of this groove 29 forms the stop piece 24 against which the guide pin 32 bears. In the embodiment of FIG. 5*d*), the stop counter piece 25 provided is a circlip 33, a clamp or the like, which is guided radially from the outside inward by one or more assigned apertures 34, for example, slots, in the support sleeve 16 and engages with the stop piece 24 on the inside.

In the exemplary embodiments of FIGS. 6 and 7, the spindle drive 1 has a covering sleeve 35 which is made, for example, of metal or a plastics material and which is connected in an axially fixed and in particular rotationally fixed manner, such as sealingly, to the drive connection 11 of the drive portion 9 to which the spindle nut 8 is assigned. In this case, the axially fixed and for example rotationally fixed connection is produced by way of a radially inwardly directed collar 36 of the covering sleeve 35, the collar being connected to a radially outwardly pointing portion of the drive connection 11. In this case, the support sleeve 16 runs, here in the retracted state and in the extended state, at least in certain portions radially within the covering sleeve 35. In addition or alternatively, the covering sleeve 35 bears, for example, by way of at least one circumferential rib 37, such as sealingly, radially on the outer side of the support sleeve 16.

As an example, the covering sleeve 35 also serves to axially carry along the support sleeve 16 over the second travel path section $s_2$ of the adjustment travel path s during the drive movement from the retracted state into the extended state. The covering sleeve 35 thus performs the function of the spindle guide tube 14 of FIGS. 2 and 3.

For this purpose, as an example, it is the case that the covering sleeve 35 has a driver 38 which, during the drive movement from the retracted state (FIG. 6*a*)) into the extended state (FIG. 6*b*)), provides an axial stop for a driver counter piece 39 on the support sleeve 16. This is effected for example, in such a way that, during the drive movement from the retracted state into the extended state, the support sleeve 16 is carried along by the driver 38 of the covering sleeve 35, along the geometrical drive longitudinal axis 13, over the second travel path section $s_2$. As one example, during the drive movement from the retracted state into the extended state, the driver 38 of the covering sleeve 35 and the driver counter piece 39 of the support sleeve 16 are engaged, for example, constantly, when the second travel path section $s_2$ is being passed through and/or are disengaged in the retracted state and/or disengage during a drive movement from the extended state into the retracted state.

In the embodiment of FIG. 6, the driver 38 is then formed by one or more radially inwardly protruding portions of the covering sleeve 35. In addition or alternatively, the driver counter piece 39 is formed here by one or more radially outwardly protruding portions of the support sleeve 16.

However, it may also be provided that the driver 38 is formed by one or more radially outwardly set-back portions of the covering sleeve 35, and/or the driver counter piece 39 is formed by one or more radially outwardly protruding, for example, elastic, portions of the support sleeve 16.

FIGS. 7*a*) to *g*) show further alternative embodiments in which a driver 38 and a driver counter piece 39 engage during the drive movement from the retracted state into the extended state such that the support sleeve 16 is conjointly moved over the second travel path section $s_2$.

In this case, FIGS. 7*a*) and *b*) show further alternative embodiments regarding the formation of a driver 38 on the covering sleeve 35. FIGS. 7*c*) to *g*) show further alternative embodiments regarding the formation of the driver counter piece 39 on the support sleeve 16. In this case, the embodiments of FIGS. 6 and 7*a*) to *g*) regarding the formation of a driver 38 and regarding the formation of the driver counter piece 39 may be combined with one another in virtually any desired manner.

According to the embodiment in FIG. 7*a*), the driver 38 is formed by a latching hook 40 which radially inwardly extends in the region of a cutout within the wall of the covering sleeve 35. According to the embodiment in FIG. 7*b*), the driver 38 is formed by a radially inwardly crimped axial end portion 41 of the covering sleeve 35.

According to the embodiment in FIG. 7*c*), the driver counter piece 39 is formed by a window-like cutout 42 within the wall of the support sleeve 16, and a driver 38 in the form of a latching hook 40 as per FIG. 7*a*) can be brought into engagement with said cutout. According to the embodiment in FIG. 7*d*), the driver counter piece 39 is formed by a circumferential groove 43, and for example, a driver 38 in the form of a latching hook 40 as per FIG. 7*a*) can also be brought into engagement with said groove. According to the embodiment in FIG. 7*e*), the driver counter piece 39 is formed by a radially outwardly bent axial end portion 44, and for example, a driver 38 in the form of a latching hook 40 as per FIG. 7*a*) or a driver 38 in the form of a radially inwardly crimped axial end portion 41 as per FIG. 7*b*) can be brought into engagement with said bent axial end portion. According to the embodiment in FIG. 7*f*), the driver counter piece 39 is formed by an axial end portion 45 which is outwardly widened in a conical manner, and for example, a driver 38 in the form of a latching hook 40 as per FIG. 7*a*) or a driver 38 in the form of a radially inwardly crimped axial end portion 41 as per FIG. 7*b*) can also be brought into engagement with said conically widened axial end portion. According to the embodiment in FIG. 7*g*), a separate end piece 46, which is radially widened in certain portions, has been axially inserted into the support sleeve 16. Here, too, the driver counter piece 39 is formed by a circumferential groove 47 which is formed axially between the end piece 46 and the support sleeve 16, and for example, a driver 38 in the form of a latching hook 40 as per FIG. 7*a*) can also be brought into engagement with said circumferential groove.

According to a further teaching, which is of independent significance, a closure element arrangement of a motor vehicle, comprising a closure element 2 for closing a closure element opening 48 of the motor vehicle and comprising a proposed spindle drive 1, which is coupled to the closure element 2 on the one hand and the rest of the motor vehicle on the other hand, for motorized adjustment of the closure element 2, is claimed. Reference may be made to all comments in relation to the proposed spindle drive 1.

In this respect, as an example, it is the case that, in addition to the proposed spindle drive 1, the closure element arrangement comprises at least one gas pressure spring 49 which is coupled to the closure element 2 on the one hand and the rest of the motor vehicle on the other hand. This at least one gas pressure spring 49 serves for aiding a drive movement of the closure element 2 into its open position.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE NUMBERS

1 spindle drive
2 closure element
3 drive unit
4 drive motor
5 intermediate transmission
6 spindle—spindle nut transmission
7 spindle
8 spindle nut
9 drive portion
10 drive portion
11 drive connection
12 drive connection
13 drive longitudinal axis
14 spindle guide tube
15 torsion tube
16 support sleeve
17 first support bearing
18 second support bearing
19 driver
20 driver counter piece
21 circumferential groove
22 latching hook
23 cutout
24 stop piece
25 stop counter-piece
26 spring arrangement
27 spring
28 circumferential groove
29 groove
30 latching hook
31 latching hook
32 guide pin
33 circlip
34 assigned apertures
35 covering sleeve
36 collar
37 one circumferential rib
38 driver
39 driver counter-piece
40 latching hook
41 axial end portion
42 window—like cutout
43 circumferential groove
44 axial end portion
45 axial end portion
46 end piece
47 circumferential groove
49 one gas pressure spring While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A spindle drive for adjusting a closure element of a motor vehicle, the spindle drive comprising:

a drive unit;

a spindle-spindle nut transmission, which is arranged downstream of the drive unit in terms of drive, and including a spindle and a spindle nut collectively configured to generate a number of drive movements;

a first drive portion provided with a first drive connection;

a second drive portion provided with a second drive connection, wherein the first and second drive portions are collectively configured to carry out the number of drive movements to adjust the first and second drive connections with respect to one another over an adjustment travel path along a geometrical drive longitudinal axis, to change the first and second drive connections between a retracted state and an extended state, in which at least one of the first and second drive connections move away from the other of the first and second drive connections, wherein the spindle forms at least a portion of the second drive portion and is axially fixed relative to the second drive connection, and the spindle nut forms at least a portion of the first drive portion and is axially fixed relative to the first drive connection; and a support sleeve configured to be displaced axially with respect to the first and second drive connections during a drive movement of the number of drive movements, wherein when the first and second drive connections are in the extended state, the support sleeve radially surrounds the spindle nut.

2. The spindle drive of claim 1, wherein as the first and second drive connections change from the retracted state to the extended state, the support sleeve is held stationary relative to the second drive connection as the first and second drive connections move with respect to one another over a first travel path section of the adjustment travel path, and wherein the support sleeve is axially displaced relative to the second drive connection as the first and second drive connections move with respect to one another over a second travel path section of the adjustment travel path, wherein the second travel path section adjoins the first travel path section.

3. The spindle drive of claim 2, further comprising:

a spindle guide tube provided with a driver, as the first and second drive connections change from the retracted state to the extended state, the driver is configured to provide an axial stop for a driver counter piece disposed on the support sleeve so that the support sleeve is carried by the driver along the geometrical drive longitudinal axis as the first and second drive connections move with respect to one another over a second travel path section of the adjustment travel path.

4. The spindle drive of claim 3, wherein the driver is formed by one or more radially outwardly protruding portions of the spindle guide tube, or the driver counter piece is formed by one or more radially inwardly protruding portions of the support sleeve.

5. The spindle drive of claim 3, wherein the driver is formed by one or more radially inwardly set-back portions of the spindle guide tube.

6. The spindle drive of claim 3, wherein as the first and second drive connections change from the extended state to the retracted state, the driver is configured to dip axially dip into a torsion tube, wherein the torsion tube configured to axially guide the spindle nut.

7. The spindle drive of claim 3, further comprising:

a spring configured to preload the support sleeve in a first direction of the drive movement as the first and second drive connections change from the retracted state to the extended state or a second direction, wherein the second drive connection moves relative to the second drive connection in the second direction; or a magnet arrangement or a latching arrangement, wherein during the drive movement as the first and second drive connections change from the retracted state to the extended state, the magnet arrangement or the latching arrangement is configured to retain the support sleeve to the first drive connection or to the spindle guide tube, as the first or second drive connections move along a first travel path section of the adjustment travel path so that the support sleeve releases the first drive connection, or spindle guide tube is released from the first drive connection as the first or second drive connections move along a second travel path section of the adjustment travel path, wherein the second travel path section adjoins the first travel path section.

8. The spindle drive of claim 1, wherein as the first and second drive connections change from the retracted state to the extended state, the support sleeve is axially displaced relative to the second drive connection, as the first and second drive connections move with respect to one another over a first travel path section of the adjustment travel path, and wherein the support sleeve is held stationary relative the second drive connection as the first and second drive connections move with respect to one another over a second travel path section of the adjustment travel path, wherein the second travel path section adjoins the first travel path section.

9. The spindle drive of claim 8, further comprising:

a spindle guide tube provided with a driver, as the first and second drive connections change from the retracted state to the extended state, the driver is configured to provide an axial stop for a driver counter piece disposed on the support sleeve so that the support sleeve is carried by the driver along the geometrical drive longitudinal axis as the first and second drive connections move with respect to one another over the second travel path section of the adjustment travel path.

10. The spindle drive of claim 1, further comprising:

a spindle guide tube, wherein the spindle nut is connected and axially fixed to the first drive connection by the spindle guide tube, wherein the first drive portion includes the spindle nut, or wherein the second drive portion includes a torsion tube configured to axially guide the spindle nut and form an anti-twist safeguard between the spindle nut and the second drive portion.

11. The spindle drive of claim 10, further comprising:

a spindle guide tube, wherein the support sleeve includes a first support bearing and a second support bearing axially spaced apart from the first support bearing, wherein the first support bearing is configured to radially support the spindle guide tube to the support sleeve, or wherein the second support bearing is configured to radially support the torsion tube to the support sleeve.

12. The spindle drive of claim 11, wherein the support sleeve includes a first axial region and a second axial region, the first axial region surrounds the first support bearing and the second axial region is disposed between the first and second support bearings, the first axial region defines a first inner diameter, and the second axial region defines a second inner diameter, wherein the first inner diameter is less than the second inner diameter.

13. The spindle drive of claim 10, wherein the torsion tube includes a stop piece configured to form an axial stop for a stop counter piece as the first and second drive connections change from the retracted state to the extended state, provides an axial stop for a stop counter piece formed by or disposed on the support sleeve.

14. The spindle drive of claim 13, wherein the stop piece is formed by one or more radially outwardly protruding portions of the torsion tube, or the stop counter piece is formed by one or more radially inwardly protruding portions of the support sleeve.

15. The spindle drive of claim 13, wherein the stop piece is formed by one or more radially inwardly set-back or radially outwardly protruding portions of the torsion tube.

16. The spindle drive of claim 1, further comprising:

a covering sleeve connected and axially fixed to the first drive connection.

17. The spindle drive of claim 16, wherein the covering sleeve includes a driver, wherein during the drive movement and as the first and second drive connections change from the retracted state to the extended state, the driver is configured to form an axial stop for a driver counter piece disposed on the support sleeve.

18. The spindle drive of claim 17, wherein the driver is formed by one or more radially inwardly protruding portions of the covering sleeve, or the driver counter piece is formed by one or more radially outwardly protruding portions of the support sleeve.

19. The spindle drive of claim 17, wherein the driver is formed by one or more radially outwardly set-back portions of the covering sleeve, or the driver counter piece is formed by one or more radially outwardly protruding portions of the support sleeve, wherein the portions are formed of an elastic material.

20. A closure element arrangement for use in a motor vehicle, the closure element arrangement comprising:

a closure element configured to move from an open position to a closed position to close a closure element opening defined by the motor vehicle;

a spindle drive coupled to the closure element and the motor vehicle and configured to provide motorized adjustment of the closure element, the spindle drive including, a drive unit;

a spindle-spindle nut transmission, which is arranged downstream of the drive unit in terms of drive, and including a spindle and a spindle nut collectively configured to generate a number of drive movements;

a first drive portion provided with a first drive connection;

a second drive portion provided with a second drive connection, wherein the first and second drive portions are collectively configured to carry out the number of drive movements to adjust the first and second drive connections with respect to one another over an adjustment travel path along a geometrical drive longitudinal axis, to change the first and second drive connections between a retracted state and an extended state, in which at least one of the first and second drive connections move away from the other of the first and second drive connections, wherein the spindle forms at least a portion of the second drive portion and is axially fixed relative to the second drive connection, and the spindle nut forms at least a portion of the first drive portion and is axially fixed relative to the first drive connection;

a support sleeve configured to be displaced axially with respect to the first and second drive connections during a drive movement of the number of drive movements, wherein when the first and second drive connections are in the extended state, the support sleeve radially surrounds the spindle nut.

21. The closure element arrangement of claim 20, further comprising:

at least one gas pressure spring coupled to the closure element and the motor vehicle, wherein the at least one gas pressure spring is configured to assist the spindle drive in moving the closure element to the open position.

* * * * *